UNITED STATES PATENT OFFICE.

TJARK J. VENEMA, OF GRAND RAPIDS, MICHIGAN.

MIXED PAINT.

SPECIFICATION forming part of Letters Patent No. 334,493, dated January 19, 1886.

Application filed November 9, 1885. Serial No. 182,304. (Specimens.)

*To all whom it may concern:*

Be it known that I, TJARK J. VENEMA, a citizen of the United States, residing at Grand Rapids, in the county of Kent and State of Michigan, have invented certain new and useful Furniture-Filling, being a composition of matter; and I do declare the following to be a full, clear, and exact description of the invention, such as will enable others skilled in the art to which it appertains to make and use the same.

My composition consists of the following ingredients, viz: of resin, two (2) parts; of beeswax, one (1) part; of turpentine, eleven (11) parts. Boil the mixture gently for about five minutes. Then add of silver-white, twenty (20) parts; of stucco, one (1) part; of slaked lime, one (1) part; of flour or corn-starch, two (2) parts; of raw linseed-oil, five (5) parts; of Japan varnish, two (2) parts. Boil this mixture gently for about ten minutes. Then to five (5) parts of the composition thus obtained add of naphtha, eleven (11) parts; of raw linseed-oil, seven (7) parts; of silver-white, eight (8) parts; of turpentine, ten (10) parts, and of Japan varnish, two (2) parts. Add coloring-matter as desired.

In applying the above-described composition I use a brush and put on a good coating of said preparation and rub it well in. Then with a second brush, which should be dry, or nearly so, I again rub thoroughly, brushing both along and across the grain, so as to get an even and smooth surface. It should be applied rapidly. In from ten to twelve hours after the composition is thus applied the surface so filled is in condition to be varnished.

By using this composition I dispense with the use of racks, brooms, and picks, and also save greatly in time and labor.

What I claim, and desire to secure by Letters Patent of the United States, is—

The herein-described composition of matter to be used for filling furniture or wooden surfaces of any kind, consisting of resin, beeswax, turpentine, silver-white, stucco, slaked lime, flour, raw linseed-oil, japan, naphtha, and coloring-matter, combined substantially in the manner and proportions specified.

In testimony whereof I affix my signature in presence of two witnesses.

TJARK J. VENEMA.

Witnesses:
WILLIAM A. CHAPMAN,
ADOLPH B. MASON.